United States Patent

[11] 3,612,508

[72] Inventor William E. Rise
    Portage, Mich.
[21] Appl. No. 26,564
[22] Filed Apr. 8, 1970
[45] Patented Oct. 12, 1971
[73] Assignee General Motors Corporation
    Detroit, Mich.

[54] HEATER CORE FIXTURE FOR FACE SOLDERING
    3 Claims, 4 Drawing Figs.
[52] U.S. Cl. .................................................. 269/90,
                                                            269/203
[51] Int. Cl. ................................................. B25b 5/02
[50] Field of Search ........................................ 248/316 A;
    269/90, 91, 138, 140, 166, 167, 287, 190,
    203–206, 229, 236, 256; 228/44, 47

[56] References Cited
    UNITED STATES PATENTS
    1,268,880  6/1918  Roos ............................ 269/167
    3,318,503  5/1967  Plegat ........................... 228/47 X
    3,395,439  8/1968  Palesi et al. ................... 269/287 UX

*Primary Examiner*—Theron E. Condon
*Assistant Examiner*—Neil Abrams
*Attorneys*—William S. Pettigrew, J. C. Evans and K. H. MacLean, Jr.

ABSTRACT: In preferred form a fixture for clamping a rectangular heater core between first and second parallel framing members for a subsequent face-soldering operation. The fixture is readily adapted to automatic loading of the heater cores accomplished first by the application of an external clamping force normally against the parallel framing members and next by the application of a locking force axially on a cross rod which maintains the spatial relation between the framing members established by the external clamping force. Cam surfaces on the ends of the cross rod coact with cam surfaces on the ends of two parallel rods which extend normally between and through the framing members to create a frictional holding force between the parallel rods and the framing member.

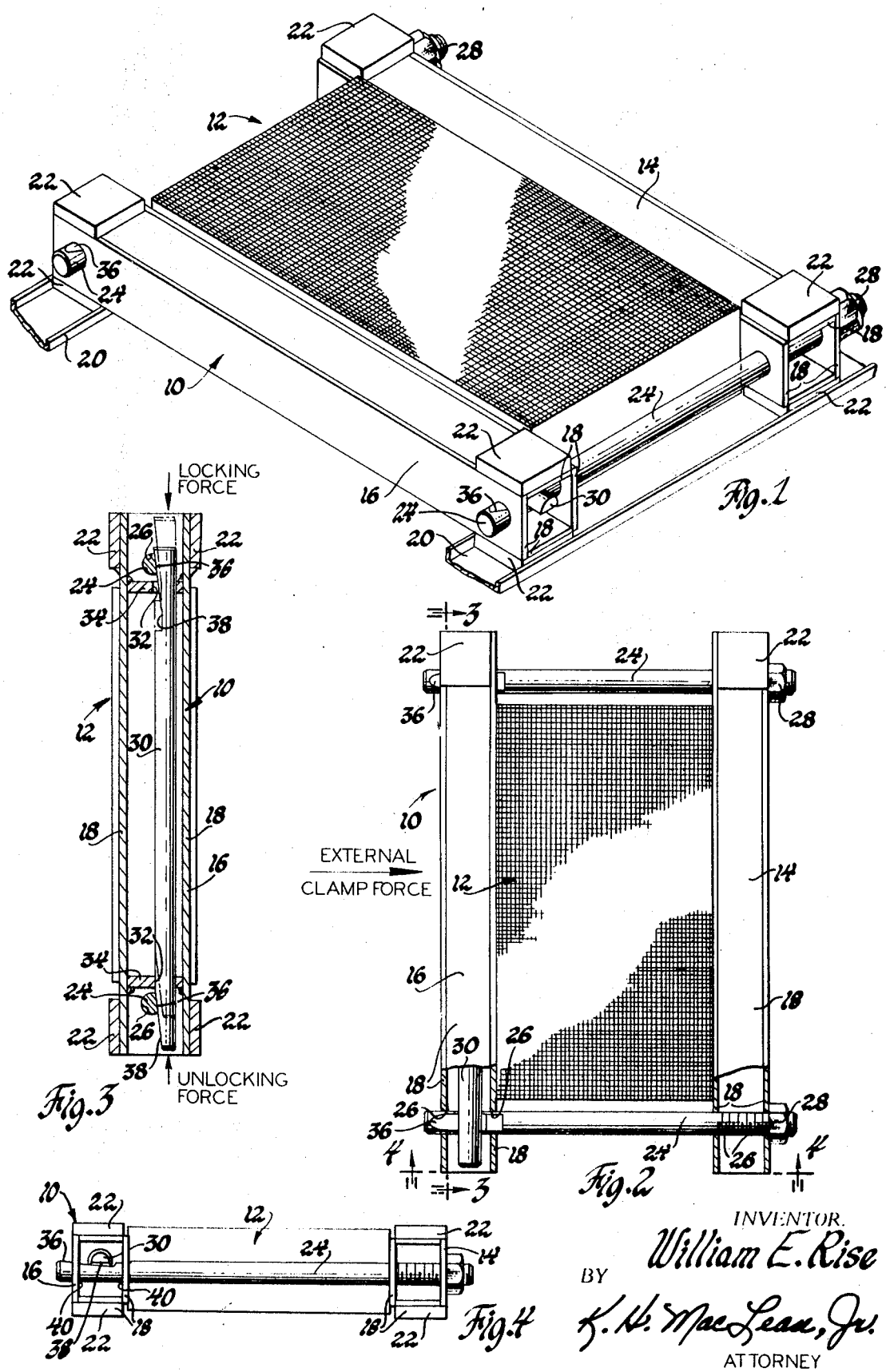

3,612,508

HEATER CORE FIXTURE FOR FACE SOLDERING

This invention relates to a fixture for clamping and supporting a heater core subsequent to undergoing soldering operations.

Present heater core fixtures employ heavy frames having eccentric shafts pivoted therein by levers to establish clamping forces on the heater cores. This type fixture works well with manual loading of the heater cores, but is unsuitable for automatic loading of heater cores.

The subject fixture for clamping and supporting heater cores includes parallel framing members which are initially pushed against a heater core therebetween in response to an external clamping force applied normally against the framing members. Parallel rods which extend between and through ends of the framing members permit relative movement of the members along the rods. A nut fastener on each rod end adjacent one framing member secures the framing member to the parallel rod. A cross rod which extends axially along the other framing member has cam surfaces on both its ends which coact with cam surfaces on the parallel rods when an axial locking force is applied to the cross rod. A resultant frictional force between the parallel rods and the framing member maintains a predetermined spatial relationship between the framing members developed by the external clamping force.

The linearly applied clamping and locking forces utilized with the subject heater core fixture are readily accomplished by automatic machinery. In contrast, prior manually operated fixtures required relatively precise rotational movement. In addition, the externally applied clamping force positions the subject fixture for subsequent application of the locking force.

Therefore, an object of the inventor in the present invention is to provide a fixture suitable for use with an automatic loading apparatus to clamp and support a heater core during a face-soldering operation.

A further object of the inventor in the present invention is to provide a fixture for clamping and holding a heater core between a pair of frame members which are initially pressed against opposite edges of the core by an externally applied clamping force and are subsequently fixed in this spatial relationship by the application of an external locking force on a cross rod which causes its cam surfaces to coact with cam surfaces on rods which extend between the frame members.

Further objects and advantages of the present invention will be apparent from the following detailed description, reference being had to the accompanying drawings wherein a preferred embodiment of the present invention is clearly shown.

In the drawings:

FIG. 1 is a perspective view of the fixture and a heater core;

FIG. 2 is an elevational view of the fixture and heater core shown in FIG. 1;

FIG. 3 is a front sectional view of the fixture taken along section line 3—3 of FIG. 2;

FIG. 4 is an end sectional view of the fixture taken along section line 4—4 in FIG. 2.

A fixture 10 and heater core 22 are illustrated in FIG. 1. The fixture 10 includes a first frame member 14 and a second frame member 16 spaced along opposite edges of the heater core 12. Frame members 14 and 16 are each formed by four elongated plates 18 welded or otherwise fastened together to form a hollow elongated member of generally rectangular cross section. The fixture 10 is supported upon parallel channels 20 which guide the heater core through face-soldering operations. Guide blocks 22 are fastened upon the ends of members 14 and 16 and are adapted to rest within the U-shaped channels 20. Blocks 22 guide the fixture 10 and the heater core 12 smoothly along channels 20 during the soldering operations.

Frame members 14 and 16 extend along opposite edges of the heater core 12. Parallel rods 24 extend between members 14 and 16 and project through bores 26 in the ends of the frame members. This permits sliding movement of members 14 and 16 along the parallel rods 24 during loading and unloading of the heater core 12. The rod ends adjacent member 14 are threaded to accept nut fasteners 28 which limit the movement of frame member 14 on control rods 24.

A cross rod 30 is supported for axial movement within the hollow interior of member 16 by bores 32 in partitions 34. The parallel rods 24 and the cross rod 30 are aligned normal to one another. Cam surfaces 36 are formed upon the ends of control rods 24 as best seen in FIG. 4. Cam surfaces 38 are formed upon both ends of the cross rod 30 as best seen in FIG. 3. The cam surfaces 36 and 38 coact to produce a radial force on the parallel rods 24 when cross rod 30 is moved downward in FIG. 3. This creates a frictional force between the rods 24 and the member 16 as at 40. This frictional force maintains a predetermined spatial distance between the members 14 and 16 which holds the heater core therebetween.

The fixture 10 is especially suitable for use with an automatic loading apparatus which automatically positions the core 12 between spaced members 14 and 16. Next, an external clamping force as shown in FIG. 2 is applied against the member 16 while member 14 is laterally supported. A locking force is subsequently applied against the cross rod 30 to move it into a locked position shown by solid lines in FIG. 3. Consequently, heater core 12 is clamped between the frame members 14 and 16. The fixture 10 and heater core 12 are then slid along channels 20 through various soldering operations.

After the soldering operations are completed, an unlocking force is applied against cross member 30 to move it into the position shown by broken lines in FIG. 3. The heater core 12 is then automatically removed from the fixture 10.

The cam surfaces 36 and 38 on parallel rods 24 and cross rod 30, respectively, are inclined 5 to 10 degrees with respect to the axes of the rods 24 and rod 30. The inclinations of cammed surfaces 36 and 38 are the same. The locking and unlocking force required is proportionate to the inclination of surfaces 36 and 38. An inclination of 7 degrees produced desirable clamping force in a working embodiment.

While the embodiment of the invention as herein described constitutes a preferred form, other forms may be adapted.

What is claimed is:

1. A fixture for clamping and supporting a generally rectangular heater core during a soldering operation comprising: first and second frame members adapted to contact opposite edges of the heater core when an external clamping force is applied normal to the axes of the member to establish a predetermined spatial relationship between said frame members; a rod extending from each end of said first frame member to each end of said second frame member in a substantially normal direction to the axes of said members; said rods being substantially parallel and extending through bores in said members for relative movement of said members along said rods; means holding said first frame member and said rods in a predetermined relative position; a cross rod supported by said second frame member normal to said parallel rods and axially reciprocal between lock and unlock positions by externally applied locking and unlocking forces; cam surfaces on said parallel rods adjacent said second frame member; cam surfaces on said cross rod coactive with said cam surfaces of said parallel rods when said cross rod is axially reciprocated in one direction to cause said parallel rods to bear against said second frame member in locking frictional relationship and to maintain said predetermined spatial relationship between said first and second frame members; said cam surfaces inclined at a predetermined angle with respect to the axes of said rods.

2. A fixture for clamping and supporting a generally rectangular heater core during a soldering operation comprising: first and second frame members adapted to contact opposite edges of the heater core when an external clamping force is applied normal to the axes of the members to establish a predetermined spatial relationship between said frame members; a rod extending from each end of said first frame member to each end of said second frame member in a substantially normal direction to the axes of said members; said rods being substantially parallel and extending through bores in said members for relative movement of said members along said rods; means holding said first frame member and said rods in a predetermined relative position, including threaded ends of said parallel rods adjacent said first frame member, and threaded nut fasteners thereon which are axially adjustable on said threaded ends; a cross rod supported by said second frame member normal to said parallel rods and axially reciprocal between lock and unlock positions by externally applied locking and unlocking forces; cam surfaces on said parallel rods adjacent said second frame member; cam surfaces on said cross rod coactive with said cam surfaces of said parallel rods when said cross rod is axially reciprocated in one direction to cause said parallel rods to bear against said second frame member in locking frictional relationship and to maintain said predetermined spatial relationship between said first and second frame members; said cam surfaces inclined at a predetermined angle with respect to the axes of said rods.

3. A fixture for clamping and supporting a generally rectangular heater core during a soldering operation comprising: first and second frame members adapted to contact opposite edges of the heater core when an external clamping force is applied normal to the axes of the members to establish a predetermined spatial relationship between said frame members; a rod extending from each and of said first frame member to each end of said second frame member in a substantially normal direction to the axes of said members; said rods being substantially parallel and extending through bores in said members for relative movement of said members along said rods; means holding said first frame member and said rods in a predetermined relative position; a cross rod supported by said second frame member normal to said parallel rods and axially reciprocal between lock and unlock positions by externally applied locking and unlocking forces; cam surfaces on said parallel rods adjacent said second frame member; cam surfaces on said cross rod coactive with said cam surfaces of said parallel rods when said cross rod is axially reciprocated in one direction to cause said parallel rods to bear against said second frame member in locking frictional relationship and to maintain predetermined spatial relationship between said first and second frame members; said cam surfaces inclined at a predetermined angle with respect to the axes of said rods; wherein said predetermined angle is within the range of 5 to 10 degrees with respect to the axes of said rods.